United States Patent [19]

Votta

[11] Patent Number: 4,805,864

[45] Date of Patent: Feb. 21, 1989

[54] BEVERAGE CADDY APPARATUS FOR VEHICLES

[76] Inventor: Michael Votta, 6416 Friars Rd., #311, San Diego, Calif. 92108

[21] Appl. No.: 127,136

[22] Filed: Dec. 1, 1987

[51] Int. Cl.[4] .................................................. A47G 29/00
[52] U.S. Cl. ...................................... 248/311.2; 248/211
[58] Field of Search ............... 248/311.2, 309.1, 318, 248/313, 238, 210, 295.1; 108/45, 46, 48; 297/188, 191; 211/128

[56] References Cited

U.S. PATENT DOCUMENTS

| | | | |
|---|---|---|---|
| 604,549 | 5/1898 | Spencer | 248/210 X |
| 1,760,803 | 5/1930 | Wirth | 248/238 X |
| 2,189,607 | 2/1940 | Krischke | 108/46 |
| 2,467,424 | 4/1949 | Bucher et al. | 248/238 |
| 2,584,646 | 2/1952 | Wagstaff | 108/45 X |
| 2,672,988 | 3/1954 | Johnson | 211/88 |
| 3,008,679 | 11/1961 | Powell | 248/311.2 X |
| 3,190,241 | 6/1965 | Rodgers et al. | 108/45 |
| 3,229,946 | 1/1966 | MacKay | 248/311 |
| 3,473,772 | 10/1969 | Nilson | 248/311.2 X |
| 3,477,679 | 11/1969 | Lovitz | 248/311.2 X |
| 3,642,240 | 2/1972 | Hershey | 248/210 |
| 3,712,235 | 1/1973 | Russ | 108/46 |
| 3,838,841 | 10/1974 | Cadman | 248/240.4 |
| 3,964,612 | 6/1976 | Skilliter, Jr. et al. | 248/309.1 X |
| 4,449,750 | 5/1984 | Pultman | 297/188 |

FOREIGN PATENT DOCUMENTS

| | | | |
|---|---|---|---|
| 47195 | 4/1933 | Denmark | 108/46 |
| 775839 | 5/1957 | United Kingdom | 108/46 |

Primary Examiner—Ramon S. Britts
Assistant Examiner—Karen J. Chotkowski
Attorney, Agent, or Firm—Henderson & Sturm

[57] ABSTRACT

A beverage carrier apparatus (10) for use in a vehicle (100); wherein, the apparatus (10) comprises in general: an upper housing unit (11) provided with a suspension unit (13); and, a lower housing unit (12) operatively connected for vertical reciprocation relative to the upper housing unit (11); wherein, one of the housing units (11)(12) is provided with a leveling means (14) which is laterally displaceable relative to the apparatus (10) and the interior of the vehicle (100) for vertically aligning the beverage carrier apparatus (10).

5 Claims, 1 Drawing Sheet

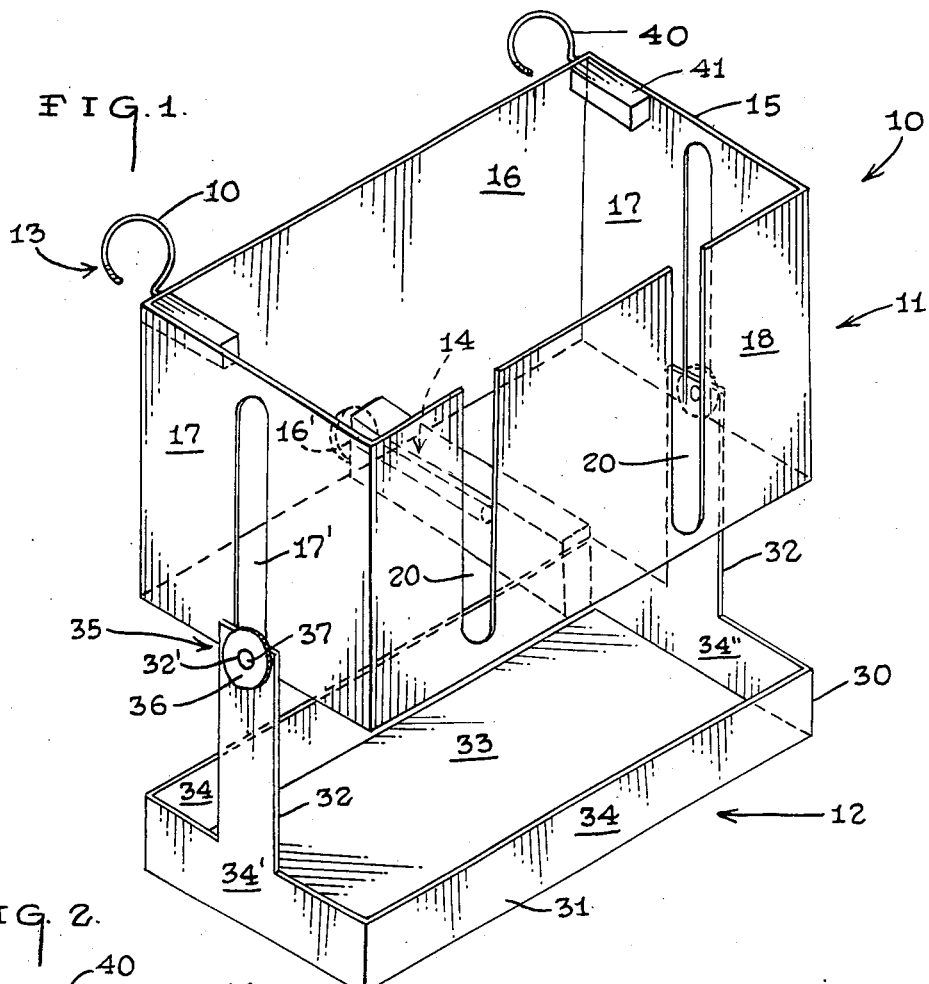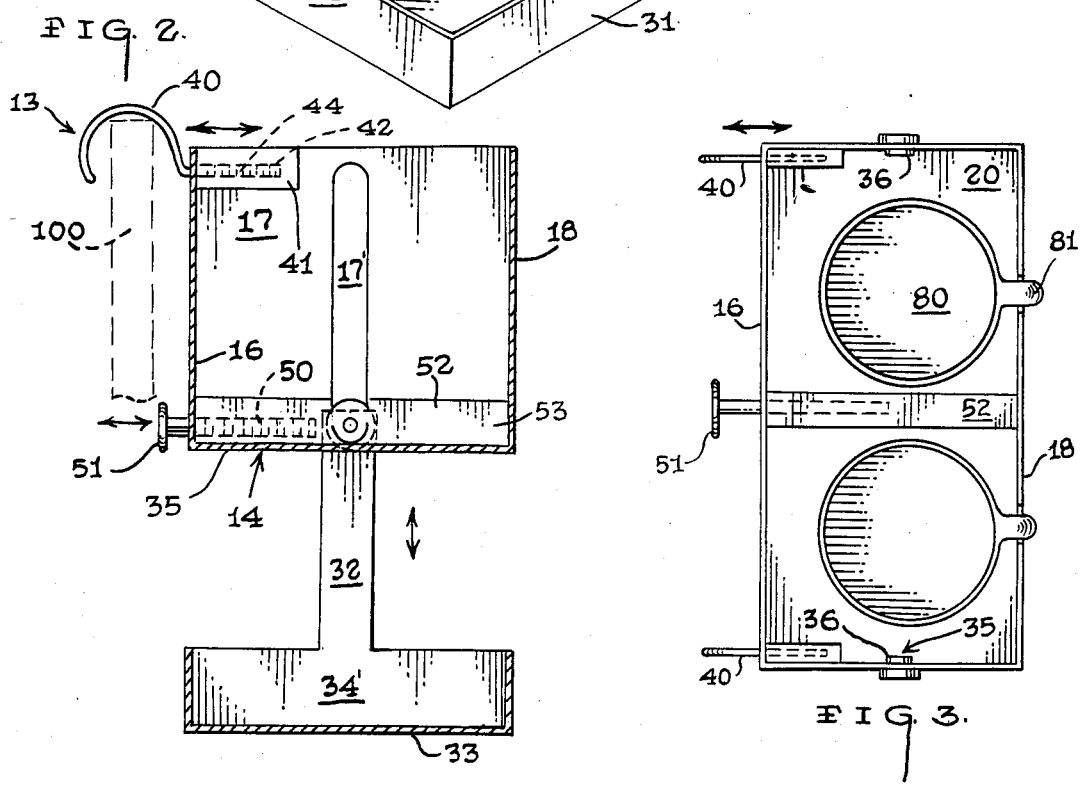

4,805,864

BEVERAGE CADDY APPARATUS FOR VEHICLES

TECHNICAL FIELD

This invention relates in general to support devices for beverage receptacles and other disparate articles, and in particular to suspended support devices which cooperate with the interior of motor vehicles.

BACKGROUND OF THE INVENTION

The present invention was the subject matter of DDP Registration Number 171643 which was filed in the United States Patent and Trademark Office on June 10, 1987.

As can be seen by reference to the following U.S. Pat. Nos.: 3,838,841; 3,712,235; 3,229,946; and 2,672,988, the prior art is replete with myriad and diverse article suspension and support devices which are adapted to be attached to the interior of a motor vehicle.

While the prior art constructions are more than adequate for the purpose and function for which they were specifically designed, they do suffer from a number of shared deficiencies. In particular, the prior art constructions normally employ a single limited capacity receptacle member, which is as a practical matter only suited to accommodate beverage containers having certain dimensions; wherein, when the receptacle member is occupied by the beverage containers very little useful additional storage space remains within the confines of the receptacle member.

In addition, the prior art constructions normally rely on a fixed suspension system; wherein, the article suspension and support devices will only maintain the beverage containers in a truly upright disposition when certain design criteria have been met. First of all the structure from which the devices are suspended must exactly conform to the rear surface of the receptacle portion of the device; and, then the suspension arms of the device must be precisely dimensioned such that the rear surface of the receptacle portion is positioned in a flush relationship relative to the suspending structure.

Obviously these glaring deficiencies clearly indicate that the prior art constructions could be vastly improved if solutions to the aforementioned problems were incorporated into their basic design and construction. On the other hand the beverage carrier apparatus that forms the basis of the present invention is the first such article suspension and support device which is specifically designed for both vertical extension and lateral adjustment; whereby, the problems associated with the prior art constructions cease to exist.

BRIEF SUMMARY OF THE INVENTION

The present invention involves a beverage carrier apparatus which is particularly well suited for use on buses; but, which is equally adaptable for use on trucks and other automative vehicles.

The beverage carrier apparatus of this invention further comprises in general an upper housing unit and a lower housing unit which are vertically adjustable with respect to one another to vary the effective storage capacity of the lower housing unit to the upper housing unit.

In addition, the carrier apparatus further comprises a leveling means; whereby, the housing units may be laterally displaced relative to a vertical surface, such that the housing units will support one or more beverage containers in a an upright position; and, a suspension unit with laterally displaceable hook members that will operatively and releasably secure the carrier apparatus to the interior of a vehicle.

Furthermore, the carrier apparatus is also provided with handle retention means that will releasably capture the conventional handles provided on many types of beverage containers such as cups, mugs, thermoses, etc.; wherein, the handle retention means will limit the lateral displacement of those types of beverage containers relative to the carrier apparatus.

By virtue of the foregoing features the beverage carrier apparatus of this invention provides a safe, economical, and handy beverage caddy that a traveler can quickly and easily install on the interior of a vehicle; wherein, the travelers beverage containers can be selectively positioned at a given location for ready access. Furthermore, the beverage caddy of this invention includes: an adjustable suspension unit and a leveling means to orient the beverage containers in a truly upright position; and, a handle retention means to capture the handles of any containers provided therewith, such that the possibility of tipping or spillage of the beverage container is reduced to the greatest possible extent.

It should also be noted that the vertically adjustable relationship between the upper and lower housing units provides a variable capacity lower tray member that will accommodate disparate articles beneath the primary beverage container support tray of the upper housing unit.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein:

FIG. 1 is a perspective view of the beverage carrier apparatus of this invention;

FIG. 2 is a cross-sectional view of the apparatus taken through line 2—2 of FIG. 1; and, FIG. 3 is a top plan view of the apparatus.

BEST MODE FOR CARRYING OUT THE INVENTION

As can be seen by reference to the drawings, and in particular to FIG. 1, the beverage carrier apparatus that forms the basis of the present invention is designated generally by the reference numeral (10). The apparatus (10) comprises in general: an upper housing unit (11); a lower housing unit (12); a suspension unit (13); and, a leveling means (14). These units and means will now be described in seriatim fashion.

The upper housing unit (11) comprises an enlarged upper tray member (15) having an open top generally rectangular configuration; wherein, the upper tray member (15) is provided with four generally elongated vertical wall segments including: a rear wall (16); a pair of apertured side walls (17); a front wall (18); and, a floor panel (19).

As can be seen by reference to FIG. 1, each of the side walls (17) are provided with an elongated centrally disposed vertical aperture (17'); and, the front wall (18) is provided with a plurality of vertically disposed generally narrow recesses (20) which originate at the top, and terminate at a location spaced from the bottom of the front wall (18).

The lower housing unit (12) comprises a lower tray member (30) including a generally rectangular shallow tray element (31) having a pair of elongated arm elements (32) projecting upwardly from opposed sides of the tray element (31). The shallow tray element (31) further comprises a floor panel (33) surrounded by four relatively short wall segments (34); wherein, two of the opposed wall segments (34')(34") are provided with the elongated vertically extending arm elements (32).

In addition, the upper ends of the arm elements (32) are provided with discrete threaded apertures (32') which are dimensioned to receive releasable locking members (35); wherein, the releasable locking members (35) form the operative connection between the first housing unit (11) and the second housing unit (12). The locking members (35) comprise in general an enlarged knob element (36) having a relative short threaded stem (37); wherein, the threaded stem (37) extends through the apertures (17') in the upper tray member (15) engages the apertures (32') in the elongated arms (32) of the lower tray member (30). The enlarged knob element (36) is thereby adapted to frictionally engage the interior of the upper tray member (15) to selectively position the lower tray member (30) beneath the upper tray member (15) at a desired vertical height.

As can best be seen in FIG. 2, the suspension unit (13) comprises a pair of suspension hook members (40) and a pair of anchoring members (41); wherein, each anchoring member (41) comprises a hollow threaded element (42) which is operably attached to the rear wall (16) and a side wall (17) proximate the upper opening. The suspension hook members (40) comprise a hook element (43) and a threaded element (44); wherein, the threaded element (44) of each hook member (40) is dimensioned to cooperate with and to be laterally displaceable with respect to a corresponding anchoring member (41); and wherein, the hook members (40), once in place, are adapted to fit over and engage a portion of a vehicle interior (100) in a well recognized fashion.

As shown in FIGS. 2 and 3, the leveling means (14) comprises: an elongated threaded rod member (50) having an enlarged head portion (51) formed on one end; and, a hollow threaded anchoring member (52) that extends horizontally along the floor panel (19) from the front wall (18) to the rear wall (16); whereby, the enlarged head portion (51) may be displaced relative to the threaded anchoring member (52).

As can best be appreciated by reference to FIGS. 1 and 2, the rear wall (16) of the upper tray member (15) line (21) is provided with an aperture (16') adjacent the anchoring member (52) which is dimensioned to receive the threaded rod member (50); and, the front end (53) of the horizontally disposed anchoring member (52) is operably connected to the front wall (18) opposite the aperture (16') of the rear wall (16); whereby, the leveling means (14) bisects the width of the upper tray member (15).

Turning now to FIGS. 1 and 3, it can be appreciated that the narrow slots (19) that are formed in the front wall (18) of the upper tray member (15) and the leveling means (14) cooperate to restrain a beverage container (80) having a handle element (81); wherein, the slots (20) will releasably capture the handle elements (81) and the leveling means will restrict the lateral displacement of a beverage container (80) relative to the upper housing unit (11).

As shown in FIG. 2, once the beverage carrier apparatus (10) has been attached to the interior of a vehicle (100) the leveling means (14) may be laterally extended or retracted to align the apparatus (10) parallel to the adjacent vertical surface of the vehicle interior (100) such that the beverage containers will be maintained in an upright position. Subsequently, the lower tray member (30) is lowered to a selected point below the upper tray member (15) such that disparate articles such as maps, coins, foodstuffs, etc. may be retained on the lower tray member (30) while the upper tray member (15) is dedicated to receiving beverage containers (80).

Having thereby described the subject matter of this invention it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A beverage carrier apparatus for supporting and suspending beverage containers and disparate articles from the interior of a vehicle; wherein, the apparatus comprises:

an upper housing unit provided with a support unit for suspending the apparatus from the interior of a vehicle; wherein, the upper housing unit comprises an open top enlarged upper tray member dimensioned to accommodate beverage containers; wherein, the upper tray member comprises four vertical wall segments including a rear wall, side walls, a front wall and a floor panel wherein a vertical aperture is formed in both of the side walls and the front wall is provided with a pair of elongated narrow recesses dimensioned to accept the handles of beverage containers;

a lower housing unit operatively associated with said upper housing unit and comprising a lower tray member including a generally shallow tray element provided with a pair of vertically projecting elongated arm elements which are disposed on opposed sides of the lower tray member; wherein the upper portion of the arm elements are operatively connected to the elongated vertical apertures in the upper tray member; and wherein the operative connection between the arm elements of the lower tray member and the elongated apertures of the upper tray member comprise: releasable locking members which extend between the upper and the lower housing units; and, a leveling means associated with the upper housing unit; wherein, the leveling means is adapted to be laterally translated to vertically align the apparatus parallel to a vertical surface on the interior of a vehicle.

2. The apparatus as in claim 1 wherein said leveling means extends from the front wall of the upper tray member along the floor panel and projects through and beyond the rear wall of the upper tray member.

3. The apparatus as in claim 2 wherein the leveling means comprises:

an elongated threaded rod member having an enlarged head portion formed on one end; and, a hollow threaded anchoring member dimensioned to receive said rod member; wherein, the enlarged head portion of the rod member may be laterally displaced relative to the anchoring member.

4. The apparatus as in claim 3 wherein said support unit is located in the uppermost rear corners of the upper tray.

5. The apparatus of claim 4 wherein said support unit comprises:
   two hook elements having extended threaded rod portions; and,
   two hollow threaded anchoring members adapted to receive said rod portions; wherein, each hook element may be laterally displaced relative to its anchoring member.

* * * * *